US008701653B2

(12) United States Patent
Spero et al.

(10) Patent No.: US 8,701,653 B2
(45) Date of Patent: Apr. 22, 2014

(54) HIGH ENERGY DENSITY THERMAL STORAGE DEVICE AND METHOD

(76) Inventors: Alan J. Spero, Ramona, CA (US); Frank Stephen Wyle, Los Angeles, CA (US)

(*) Notice: Subject to any disclaimer, the term of this patent is extended or adjusted under 35 U.S.C. 154(b) by 150 days.

(21) Appl. No.: 13/166,392

(22) Filed: Jun. 22, 2011

(65) Prior Publication Data
US 2011/0308762 A1 Dec. 22, 2011

Related U.S. Application Data

(60) Provisional application No. 61/357,293, filed on Jun. 22, 2010.

(51) Int. Cl.
*F24J 2/34* (2006.01)

(52) U.S. Cl.
USPC ........... 126/618; 126/617; 126/644; 126/688; 126/689; 165/104.11; 165/104.12; 165/104.15; 165/104.17

(58) Field of Classification Search
USPC .................. 126/617, 618, 644, 688, 689; 165/104.11, 104.12, 104.15, 104.17
See application file for complete search history.

(56) References Cited

U.S. PATENT DOCUMENTS

| | | | |
|---|---|---|---|
| 3,029,596 A * | 4/1962 | Johnston et al. | 60/524 |
| 4,126,995 A * | 11/1978 | Asselman et al. | 60/524 |
| 4,146,057 A * | 3/1979 | Friedman et al. | 60/648 |
| 4,257,402 A * | 3/1981 | Westerman, II | 126/652 |
| 4,402,306 A * | 9/1983 | McElroy, Jr. | 126/619 |
| 4,449,515 A | 5/1984 | Nilsson, Sr. | |
| 4,512,388 A | 4/1985 | Claar et al. | |
| 4,520,862 A * | 6/1985 | Helmbold | 165/10 |
| 4,586,334 A * | 5/1986 | Nilsson et al. | 60/524 |
| 4,672,178 A * | 6/1987 | Wada et al. | 392/346 |
| 4,686,961 A | 8/1987 | Garrison | |
| 4,873,038 A * | 10/1989 | Rapp et al. | 264/82 |
| 4,894,989 A * | 1/1990 | Mizuno et al. | 60/517 |
| 5,074,283 A | 12/1991 | Beatty et al. | |
| 5,404,723 A * | 4/1995 | Parker et al. | 60/641.15 |
| 5,899,088 A | 5/1999 | Purdum | |
| 6,044,200 A * | 3/2000 | Hirdes | 392/341 |
| 6,487,859 B2 * | 12/2002 | Mehos et al. | 60/641.8 |
| 6,631,755 B1 * | 10/2003 | Kung et al. | 165/46 |

(Continued)

OTHER PUBLICATIONS

PCT Application No. PCT/US2011/041498, International Search Report and Written Opinion dated Nov. 18, 2011.

(Continued)

*Primary Examiner* — Jorge Pereiro
(74) *Attorney, Agent, or Firm* — Larry E. Henneman, Jr.; Gregory P. Gibson; Henneman & Associates PLC

(57) ABSTRACT

A novel thermal storage device includes a container of metallic phase change material (MPCM). The MPCM has a high latent heat of fusion and a high thermal conductivity in its solid state. A thermal energy receiver is adapted to receive thermal energy from a thermal energy source and transfer the thermal energy directly to the MPCM, without the need for an intermediate thermal transfer fluid. A thermal energy discharge mechanism transfers thermal energy directly from the MPCM to a device that uses the thermal energy. In a solar energy embodiment, the thermal energy receiver is formed from a material (e.g., polished copper) that has a relatively low absorptivity value and a relatively low emissivity coefficient, which unexpectedly results in the attainment of a highly efficient solar receiver.

19 Claims, 5 Drawing Sheets

(56) References Cited

U.S. PATENT DOCUMENTS

| | | | | |
|---|---|---|---|---|
| 6,997,241 | B2* | 2/2006 | Chou et al. | 165/80.3 |
| 7,191,820 | B2* | 3/2007 | Chou et al. | 165/10 |
| 7,316,262 | B1* | 1/2008 | Rini et al. | 165/10 |
| 7,505,269 | B1* | 3/2009 | Cosley et al. | 361/700 |
| 8,201,615 | B2* | 6/2012 | Soukhojak et al. | 165/10 |
| 2002/0144811 | A1* | 10/2002 | Chou et al. | 165/236 |
| 2004/0211182 | A1* | 10/2004 | Gould | 60/643 |
| 2008/0099187 | A1* | 5/2008 | Rini et al. | 165/104.17 |
| 2008/0184990 | A1* | 8/2008 | Tuchelt | 126/684 |
| 2010/0101621 | A1 | 4/2010 | Xu | |
| 2010/0116266 | A1* | 5/2010 | Lovato | 126/700 |
| 2010/0212656 | A1* | 8/2010 | Qiu et al. | 126/618 |
| 2011/0083436 | A1* | 4/2011 | White et al. | 60/670 |
| 2011/0120669 | A1 | 5/2011 | Hunt | |
| 2011/0265783 | A1* | 11/2011 | Yatir | 126/600 |
| 2012/0216538 | A1* | 8/2012 | Garaway et al. | 60/641.14 |
| 2013/0056169 | A1* | 3/2013 | Stiesdal et al. | 165/10 |

OTHER PUBLICATIONS

*Reviving the Classic Heat of Fusion Fireless Steam Locomotives*, Harry Valentine, http://www.internationalsteam.co.uk/trains/newsteam/modern28.htm, Downloaded from the internet on Jun. 7, 2011.

*"Supercharging" the Traditional Fireless Steam Locomotives*, Harry Valentine, http://www.internationalsteam.co.uk/trains/newsteam/modern27.htm, Downloaded from the internet on Jun. 7, 2011.

*Liquid Tin Heat Storage for Scheffer Parabolic Cookers*, Dr. Michael Gotz, http://www.cuisinesolaire.com/E/Benicarlo03.htm, Downloaded from the internet on Jun. 6, 2011.

* cited by examiner

HIGH ENERGY DENSITY THERMAL STORAGE DEVICE AND METHOD

RELATED APPLICATIONS

This application claims the benefit of priority to U.S. Provisional Patent Application Ser. No. 61/357,293, filed Jun. 22, 2010 by the same inventors and entitled "High Energy Density Thermal Storage Device and Method," which is incorporated by reference herein in its entirety.

BACKGROUND OF THE INVENTION

1. Field of the Invention

This invention relates generally to thermal energy storage devices, and more particularly to thermal energy storage devices that store thermal energy in the form of latent and sensible heat.

2. Description of the Background Art

Thermal energy storage systems are a fast growing and evolving technology, with untapped commercial applications in the area of storage of energy from renewable (solar and wind) sources. For the most part, renewable energy generation systems are effective in delivering electrical power when the sun is shining or the wind is blowing, but not otherwise. For this reason, these systems are generally regarded as supplementary to conventional base-load generation systems (e.g., coal-fired power plants) and must operate on the grid so that power can be available from other sources at night or during cloudy or windless periods. Excess power being generated from renewable sources can be sold into the grid. However, as these systems proliferate, the cost to upgrade the power grid to accommodate such intermittent power sources could prove prohibitively costly. At present, the approach has been to incorporate into the grid rotating standby systems which are activated when the renewable source intermittency becomes an issue. Such an approach substantially increases the overall cost of increasing the fraction of renewable power in the supply system.

As a result, there is a shift in market focus to distributed, mostly autonomous systems that can meet the power requirements of smaller communities. If these requirements are to be met by renewables, there is a need for an efficient means to store excess energy collected during production hours and to make it available at other times, thus assuring a constant source of power.

There is also a need for efficient and compact storage devices in the field of power supplies for earth satellites. When solar powered, these satellites can experience a loss of power production once each orbit, when the satellite passes on the side of the earth opposite the sun. Storage devices which can provide power during these eclipses can be an essential component of the satellite's power supply system.

Among the presently available technologies that are used to store energy are batteries, flywheels, compressed air, sensible heat, and latent heat storage. The latter two technologies store energy in thermal form. They are particularly applicable when the energy production system directly produces thermal energy, as is the case with solar power and other heat-based systems.

In systems that convert thermal energy directly to electrical energy, it is important that thermal storage system be capable of operating at high temperatures that are matched to the operating temperatures of the thermal-to-electrical conversion devices such as, for example, Rankine, Brayton, or Stirling engines. Other desirable features of a thermal energy storage systems are compactness (i.e., high energy storage per unit volume), simplicity (minimal pumps or auxiliary heat exchange devices), and efficiency. Storage systems employing sensible heat fall short of many or all of these requirements.

Latent heat thermal storage systems overcome many of the above restrictions. In such systems, a material undergoes a phase change (from solid to liquid or from liquid to gas, and vice versa) as energy is stored or withdrawn. This material, commonly referred to as Phase Change Material (PCM), is chosen to be one in which the latent heat of fusion or the heat of vaporization per unit volume or per unit mass is large, thus enabling a large amount of energy to be stored using a small amount of material. The liquid and solid phases of the PCM co-exist and are in contact with each other. So long as both phases exist in equilibrium in the mixture, its temperature will be equal to the melt temperature and will remain constant. Salts, such as $NaNO_2$, $NaNO_3$, $CaCl_2$, $LiF$, and $KNO_3$, are typically considered as PCM candidates due to their high latent heat and appropriate melting temperatures.

The use of salt-based PCMs, which have low thermal conductivities, has presented a vexing problem for the direct extraction of stored energy. As heat is extracted, salt solidifies on the heat exchange surface and acts as an insulator, thereby impeding further transfer of heat from the liquid to the heat exchange surface. Because of the inherent properties of salts, thermal storage systems employing salt-based PCMs have relatively low heat extraction rates.

There have been many approaches to improving the heat extraction rates of thermal storage systems employing salt-based PCMs. For example, one approach includes partitioning the PCM-containing region using a material such as a ceramic or metal oxide which itself is capable of storing thermal energy as sensible heat. The partition material constrains the thickness of the solid PCM regions and acts as a conductor that provides a path for heat to be transported from the PCM to the heat exchange surface.

This concept has been extended to the use of a high conductivity matrix in which the PCM is embedded. This approach further limits the uninterrupted volume of the PCM and increases the area of contact between the PCM and heat transport material. One consequence of this approach is that the path for heat transport has an increased length. As another consequence to this approach, the effective volume of the PCM and, therefore, thermal energy storage capabilities of the storage device is decreased. Yet another consequence to this approach is that such systems are more sensitive to volume changes in the PCM during the melt/freeze process.

Others have suggested the use of scraping mechanisms to mechanically remove the solidified PCM from the heat exchange surface. Considering that a thermal energy storage unit is best if it is essentially a passive device (equivalent to a battery), the introduction of mechanical mechanisms with their attendant maintenance requirements is unattractive.

A fourth approach has been to use a secondary heat transfer fluid to convey heat from the PCM to the heat exchange surface. One instantiation employs floating an emulsified layer (produced by stirring) of metal in a salt PCM. Heat is transferred to the metal which is then used as a secondary heat transfer fluid. The liquid metal/liquid salt interface precludes development of an attached solid salt insulating layer. A clever variation of this approach was tested by Adinberg et al, who floated liquid sodium on a NaCl PCM. Solidification of the PCM occurs at the Na/NaCl interface from which the solid is removed naturally due to its negative buoyancy. Both these approaches are limited to only a select few PCMs and their associate temperature ranges. Furthermore, the use of sodium presents undesirable safety issues.

Note that all the previously suggested techniques entail undesirable restrictions on the working temperature range, mechanical devices, complexity, and/or reductions in the achievable energy storage density. In view of these limitations there is a need to develop thermal energy storage systems that escape the problem of insulating the heat exchange surface.

SUMMARY

In view of the above, it is an object of this invention to provide a thermal energy storage system that compactly, efficiently, and simply transfers heat to a thermal-to-electrical conversion device or some other device that utilizes the thermal energy.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combination particularly pointed out in the appended claims.

Described are a method and system for storing energy in the form of latent heat in such a way as to facilitate the extraction of stored energy without complex structures or mechanisms, external heat exchangers, or secondary heat transfer fluids. The invention utilizes a metallic phase change material (MPCM) that is wholly contained within a sealed container fabricated from a metal, ceramic, or other material that is capable of withstanding the operating temperatures of the device and is chemically inert to the MPCM. The volume of the container is chosen such that it is equal to the volume of the MPCM when the MPCM volume is at its maximum, usually when it is entirely liquid. This ensures that the container will not be breached by the MPCM as its density changes during the phase change process. The choice of MPCM and the container material is dependent in part upon the desired operating temperature range for the device. The class of MPCMs considered for use in this invention consists of those MPCMs which have the property that their latent heat and thermal conductivity are very high. This property is characteristic of most pure metals and metal alloys. Surrounding the container is an insulating blanket whose material makeup and thickness are determined by the MPCM operating temperature and the maximum amount of conductive thermal losses that can be tolerated by the application. Penetrating the container are two inserts made of a high thermal conductivity material that is inert to the MPCM. One such insert is used as the means and pathway for the introduction of thermal energy to be stored. The other insert is used as the means for extracting thermal energy. The inserts are sized and configured so that they always have a sufficiently high area of contact with the MPCM, regardless of whether it is in liquid or solid state. Alternatively, one such insert could be used for both introducing and extracting thermal energy, depending on the application. Alternatively the container could be penetrated by multiple pipes used for carrying secondary working fluids, from which and to which heat is transferred during the melting and freezing processes.

Problems associated with the prior art are overcome, at least in part, by using a phase change material for thermal storage that has a high latent heat of fusion and a high thermal conductivity in its solid state. In an example embodiment, the metal used as a thermal storage medium has a thermal conductivity in its solid state of at least 150 W/m K (Watts per meter-Kelvin). In a more particular embodiment, the quantity of metal includes Aluminum.

An example thermal energy storage device includes a container, a quantity of metal disposed within the container, a thermal energy receiver, and a thermal energy discharge mechanism. The container is formed from a first material having a melting point at a first temperature. The metal serves as a thermal storage medium and has a melting point at a second temperature lower than the first temperature. The thermal energy receiver is formed from a second material having a melting point at a third temperature higher than the second temperature, and extends through a wall of the container and into the quantity of metal. The thermal energy receiver is operative to transfer thermal energy to the quantity of metal. The thermal energy discharge mechanism is formed from a third material having a melting point at a fourth temperature. The thermal energy discharge mechanism extends through a wall of the container and into the quantity of metal, and is operative to transfer thermal energy from the quantity of metal. In an example embodiment, the second material is copper. The thermal energy receiver transfers the thermal energy to the quantity of metal without the use of a thermal conducting fluid. Similarly, the thermal energy discharge mechanism transfers heat from the quantity of metal without the use of a thermal conducting fluid. Means for receiving thermal energy outside the container, conducting the thermal energy to the quantity of metal, and conducting thermal energy from the quantity of metal from the quantity of metal to a thermally operative device, all without the use of a conducting fluid, are disclosed.

A more particular example embodiment includes a reflector disposed to reflect solar energy onto an absorbing portion of the thermal energy receiver. The absorbing portion of the thermal energy receiver absorbs a portion of incident light and reflects another portion of the incident light to impinge on another area of the absorbing portion. In one embodiment, the absorbing portion defines a cavity formed in the thermal energy receiver. More particularly, an example absorbing portion includes a cylindrical wall defining the cavity and defining an opening for receiving the incident light. The absorbing portion further includes an inclined surface disposed within the cavity such that light reflecting off of the inclined surface impinges on the cylindrical wall, and light reflecting off of the cylindrical wall impinges on the inclined surface. In an example embodiment, the inclined surface is part of a structure (e.g., a pyramid or cone) having an apex disposed near the opening and having an apex angle of no greater than 45 degrees.

In the example solar energy embodiment, the second material (the receiver) has an absorptivity value less than 0.2 and/or an emissivity coefficient less than 0.1. As a particular example, the second material includes polished copper.

In an example application, the thermal energy storage device is combined with a Stirling engine having a hot cylinder in thermal contact with the thermal energy discharge mechanism. At least a portion of a hot cylinder of the Stirling engine can form a portion of the thermal energy discharge mechanism extending through the wall of the container.

Optionally, the thermal energy receiver and the thermal energy discharge mechanism are in direct contact with (or very close to) each other. As another option, the thermal energy receiver and the thermal energy discharge mechanism can be formed integrally as a single piece extending through the quantity of metal.

The thermal energy receiver is adapted to receive thermal energy from a primary energy source. Optionally, the thermal energy storage device includes an auxiliary energy source coupled to selectively supply energy to the quantity of metal when the thermal energy available from the primary energy source is determined to be insufficient. The auxiliary energy source can be coupled to provide thermal energy directly to the quantity of metal (e.g. immersing a heating element in the metal). As an alternative, the auxiliary energy source can be coupled to provide thermal energy to the quantity of metal via the thermal energy receiver. Examples of auxiliary energy sources include, but are not limited to, an electrical resistive heater and a fuel (liquid, solid or gas) burner.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a thermal storage unit using a metal phase change material (MPCM) for thermal storage that has a high latent heat of fusion and a high thermal conductivity in its solid state. In addition, thermal energy is provided directly to the MPCM without the use of a thermal transfer fluid. Furthermore, high storage temperatures are achieved using a receiver formed from a material having a low emissivity coefficient (to minimize the amount of energy lost via radiative emission) and a low absorptivity. In the following description, numerous specific details are set forth (e.g., materials, geometric configurations, solar energy application, etc.) in order to provide a thorough understanding of the invention. Those skilled in the art will recognize, however, that the invention may be practiced apart from these specific details. In other instances, details of well known fabrication processes (e.g., welding, polishing, support structures, insulation, etc.) and solar energy components (e.g., photo voltaic panels, tracking systems, etc,) have been omitted, so as not to unnecessarily obscure the present invention.

Figure 1:
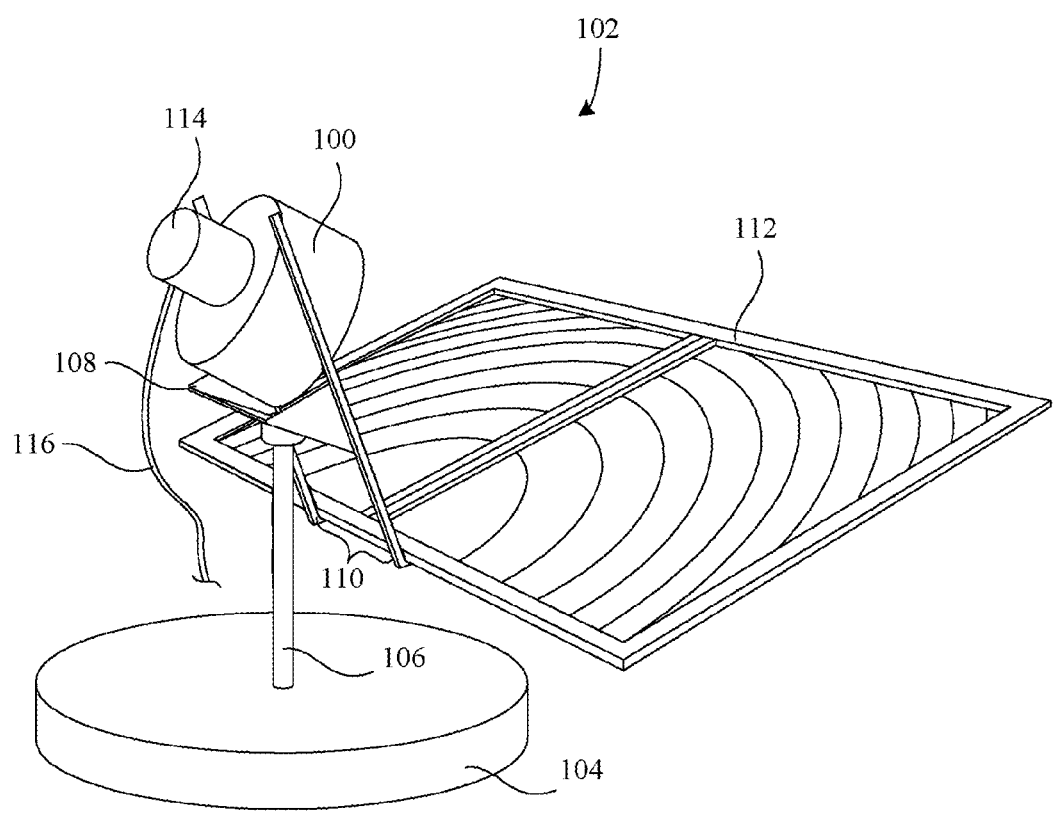
FIG. 1 is a perspective view of a thermal energy storage device incorporated into a solar energy system.

FIG. 1 is a perspective view of a thermal energy storage device 100 which, in this particular embodiment, is depicted as being part of a portable solar energy collection system 102. In addition to thermal energy storage device 100, solar energy collection system 102 also includes a base 104, a support pole 106, a mounting bracket 108, a set of support arms 110, a reflector 112, a Stirling engine/generator 114, and an electrical supply line 116. Pole 106 is coupled to base 104, bracket 108 is coupled to pole 106, arms 110 are coupled to bracket 108, reflector 112 is coupled to arms 110, storage device 100 is coupled to arms 110, and Stirling engine/generator 114 is supported by mounting bracket 108, arms 110, and pole 106. Electrical supply line transmits electrical power generated by Stirling engine/generator 114 for use elsewhere.

Base 104 is a low-profile structure that is adapted to sit on a flat surface (i.e. ground) and fixably supports pole 106 in an upright vertical position. In this particular embodiment, base 104 is a flat cylindrical reservoir adapted to hold water so as to prevent system 102 from tipping. Of course, when transporting system 102, the water can be drained from base 104.

Pole 106 is a rigid support member that includes a first end fixably mounted to base 104 and an opposite second end coupled to mounting bracket 108. Accordingly, pole 106 supports bracket 108, arms 110, reflector 112, storage device 100, and Stirling engine/generator 114.

Mounting bracket 108 is pivotally mounted to pole 106 such that both cooperate as a single trunnion assembly. That is, mounting bracket 108 can pivot about a first axis that is coaxial to pole 106 and a second axis that is perpendicular to the first axis. Rotation of mounting bracket 108 about the first axis provides a means for adjusting the azimuth angle of system 102. Similarly, rotation of mounting bracket 108 about the second axis provides a means for adjusting the elevation angle of system 102.

Arms 110 are rigid support members that are fixably mounted to opposite sides of bracket 108. Furthermore, arms 110 are fixably attached to reflector 112, storage device 100, and Stirling engine/generator 114 so as to maintain a fixed relationship therebetween. Accordingly, when the azimuth and/or elevation angle of system 102 is changed, bracket 108, arms 110, reflector 112, storage device 100, and Stirling engine/generator 114 move as a single rigid body.

Reflector 112 is, for example, a Fresnel reflector operative to reflect and focus incident solar radiation onto thermal storage device 100 where it is absorbed and then stored in the form thermal energy.

System 102 could include a two-axis sun tracking system (not shown) that automatically adjusts the azimuth and elevation of system 102 according to the position of the sun. Such a system could include, for example, a controller that communicates with a sun-sensor that detects the position of the sun, and a set of slewing drives that adjust the azimuth and elevation of the system.

Figure 2:
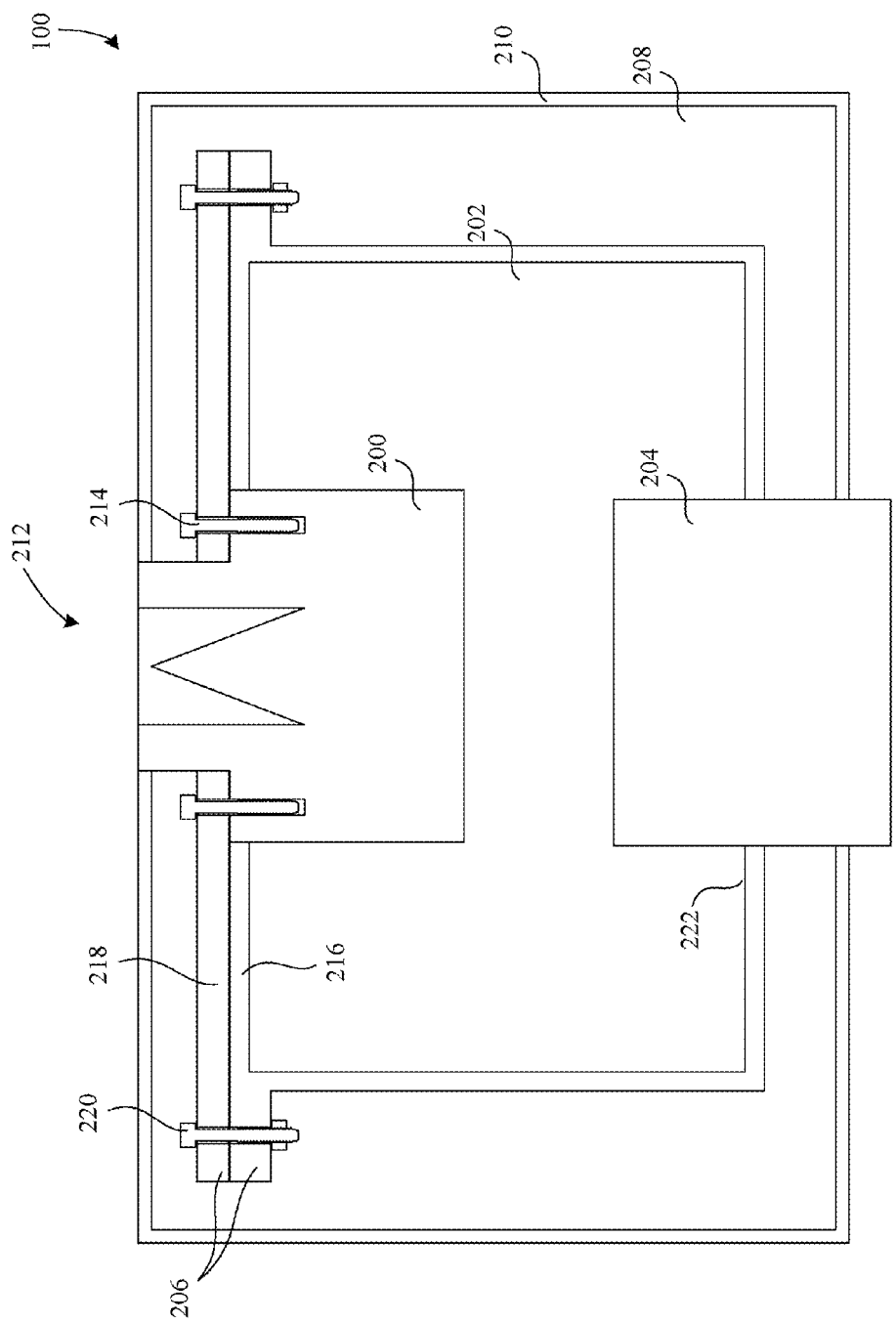
FIG. 2 is a cross-sectional side view of the thermal energy storage device of FIG. 1.

FIG. 2 shows a cross-sectional side view of thermal storage device 100 according to one embodiment of the present invention. Thermal storage device 100 includes a receiver 200, a metal phase change material (MPCM) 202, a thermal discharge mechanism 204, a container 206, an insulation layer 208, and an outer shell 210.

Receiver 200 is a thermally conductive body that absorbs radiant energy and transfers it to MPCM 202 in the form of thermal energy via conduction. Receiver 200 defines an absorbing portion 212 whereon incident light is focused and absorbed. As shown, receiver 200 extends through container 206, insulation layer 208, and outer shell 210 such that absorbing portion 212 is exposed outside of thermal storage device 100. Furthermore, the opposite end of receiver 200 is fastened to container 206 via a set of bolts 214 and is in direct thermal contact with MPCM 202. Accordingly, receiver defines a thermally conductive passageway through which heat from absorbing portion 212 is transferred directly to MPCM 202 via conduction. In this particular embodiment, receiver 200 is composed of a material having a high thermal conductivity and a high melting temperature such as, for example, copper or graphite.

MPCM 202 is composed of a material that has a much lower melting temperature than that of the materials from which receiver 200, thermal discharge mechanism 204, and container 206 are composed. This allows MPCM 202 to be heated beyond its melting temperature without compromising the structural integrities of receiver 200, thermal discharge mechanism 204, and container 206. Accordingly, thermal energy can be stored by MPCM 202 in the form of latent heat of fusion. In this particular embodiment, MPCM 202 is composed of aluminum because, unlike the aforementioned salt-based PCMs, Aluminum has a high thermal conductivity in both the liquid and solid state. Accordingly, thermal storage device 100 maintains a high heat extraction rate even when MPCM 202 solidifies around thermal extraction mechanism 204 as it cools. Indeed, solid aluminum has a conductivity of approximately 200 W/m K. This is to be compared with the conductivity of salts which are on the order of 10 W/m K. The high thermal conductivity of the solid MPCM 202 facilitates extraction of the thermal energy and eliminates many design problems.

Thermal discharge mechanism 204 is a thermally conductive body through which thermal energy is extracted from thermal storage device 100. As shown, thermal discharge mechanism 204 is in direct contact with MPCM 202 and extends through container 206, insulation layer 208, and outer shell 210. This enables the thermal energy stored in MPCM 202 to be extracted from outside of thermal storage device 100. In this particular embodiment, thermal discharge mechanism 204 is also composed of a material having a high thermal conductivity and a high melting temperature such as, for example, copper or graphite.

Container 206 is, for example, a stainless steel container that includes a bottom portion 216 and a top portion 218 fastened to one another via a set of bolts 220. The top of bottom portion 216 and top portion 218, together, define a top wall of container 206 through which receiver 200 extends. Similarly, bottom portion 216 defines a bottom wall 222 through which thermal discharge mechanism 204 extends. As previously mentioned, the material from which container 206 is composed (i.e. stainless steel) has a much higher melting temperature than the material from which MPCM 202 is composed (i.e. aluminum). As shown, insulating layer 206 is formed around the walls of container 206 so as minimize heat loss therethrough. Furthermore, outer shell 210 is a rigid structure that encloses insulation layer 208.

In the example embodiment shown, thermal energy is introduced into the MPCM 202 via a receiver 200 and is extracted from the MPCM via a separate thermal discharge mechanism 204. However, in an alternate embodiment, a single device (e.g., a modified version of receiver 200) could be used to introduce and extract the thermal energy from the MPCM 202. Additionally, although it is an important advantage that thermal energy can be transferred into and out of the MPCM 202 without the use of a heat transfer fluid, it may be advantageous to use a heat transfer fluid in some applications.

Figure 3:
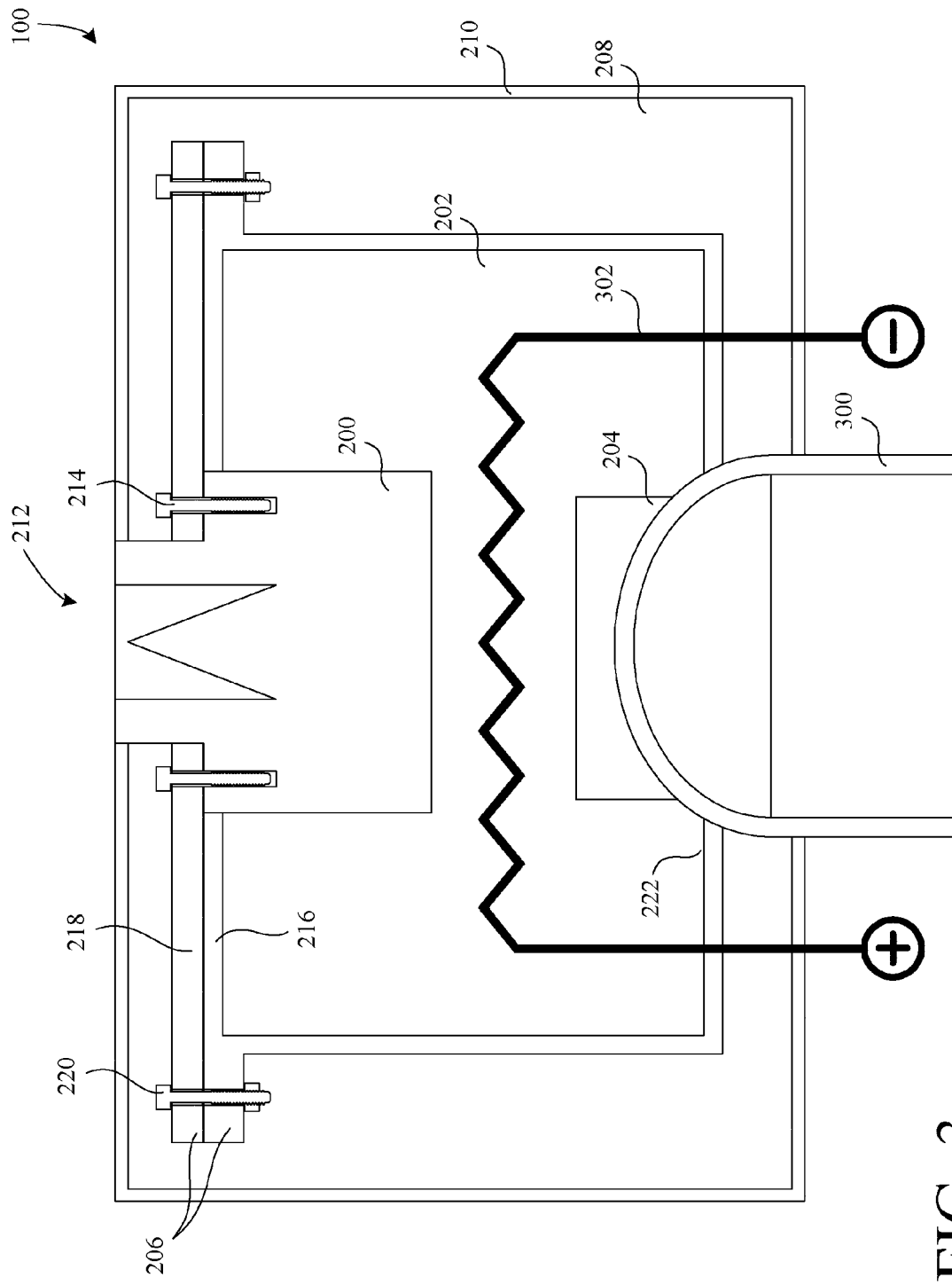
FIG. 3 is a cross-sectional side view of the thermal energy storage device of FIG. 1 in combination with a Stirling engine.

FIG. 3 shows a cross-sectional side view of thermal storage device 100 wherein thermal discharge mechanism 204 is in thermal contact with a hot cylinder 300 of a Stirling engine. Accordingly, the thermal energy supplied to cylinder 300 can be converted directly into work via the Stirling engine. Of course, the work directly output from the Stirling engine is useful in a wide variety of applications including, for example, generating electricity. It may also be desirable to make receiver 200 of sufficient length so that it extends to discharge mechanism 204. In this manner, the Stirling Engine will achieve an adequate operating temperature before MPCM 202 can stabilize at that temperature. In this manner, the solar power system can begin generating power after a shorter time on-sun than with a system employing a shorter receiver plug.

In an application wherein the energy that is desired to be stored is in the form of an electrical current, device 100 could optionally include resistive heat element 302 to heat MPCM 202 so that the energy can be stored in the thermal form. This particular application has the disadvantage that the conversion of electricity to heat and then back to electricity via an engine entails significant losses in round trip efficiency. However, there may be applications in which the efficiency is of less consequence than other consideration.

Although not shown in the drawings, device 100 could optionally include a cover that fits over receiver 200. During times when there is insufficient sunlight to drive the unit, the cover would be placed over receiver 200 to prevent excessive thermal loss. As yet another option, the cover could include a heat source (e.g., gas fuel burner, liquid fuel burner, solid fuel burner, electric heater, etc.) to provide heat to the system. The heater could be used to pre-heat the system for normal operation and/or to allow the system to continue generating power during extended periods of insufficient sunlight. Optionally, a heater (of any type) could be disposed in direct contact with or in container 206, as is resistive heat element 302.

Figure 4:
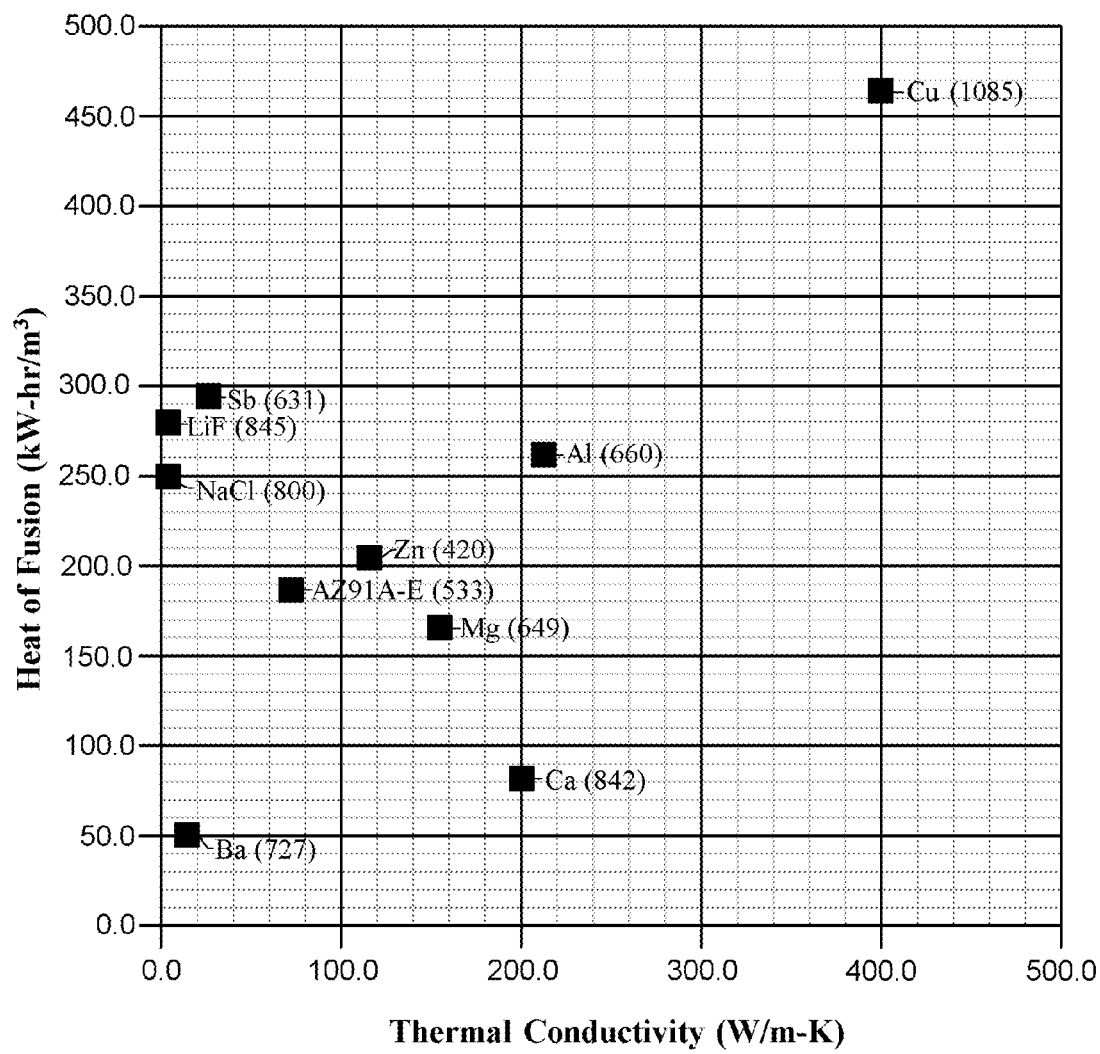
FIG. 4 is a graph showing the heat of fusion and thermal conductivity of various materials.

It should be understood that the use of MPCMs ensures that the inherent insulation problems associated with salt-based PCMs can be avoided. The selection of an appropriate MPCM for this application involves finding a material with high volume-specific latent heat, high thermal conductivity, and a melt temperature in the desired operating range. FIG. 4 shows a selection of (but not all) possible metallic PCMs plotted according to their latent heat and thermal conductivity. Materials lying to the upper right in this plot are most desirable. Materials in the lower left, or near either axis, are not desirable. Two typical salts, namely NaCl and LiF, were included for context. Note the desirability of metals such as aluminum and copper as MPCMs.

An aluminum alloy, AZ91A-E, is also shown in FIG. 4. Alloys are of particular interest for application in this invention since alloys may be constructed that have melt temperatures in many different ranges. However, alloys typically do not have a unique melt temperature; instead they begin melting at one temperature (the solidus temperature) and are completely melted at another (the liquidus temperature). Applications that can tolerate an operating range are appropriate for the use of MPCMs that are alloys. Thus for operation at even the aluminum melt temperature, here may be alloys, such as the Group I copper alloys, with an appropriate solidus/liquidus temperature range that would perform better than aluminum.

Figure 5:
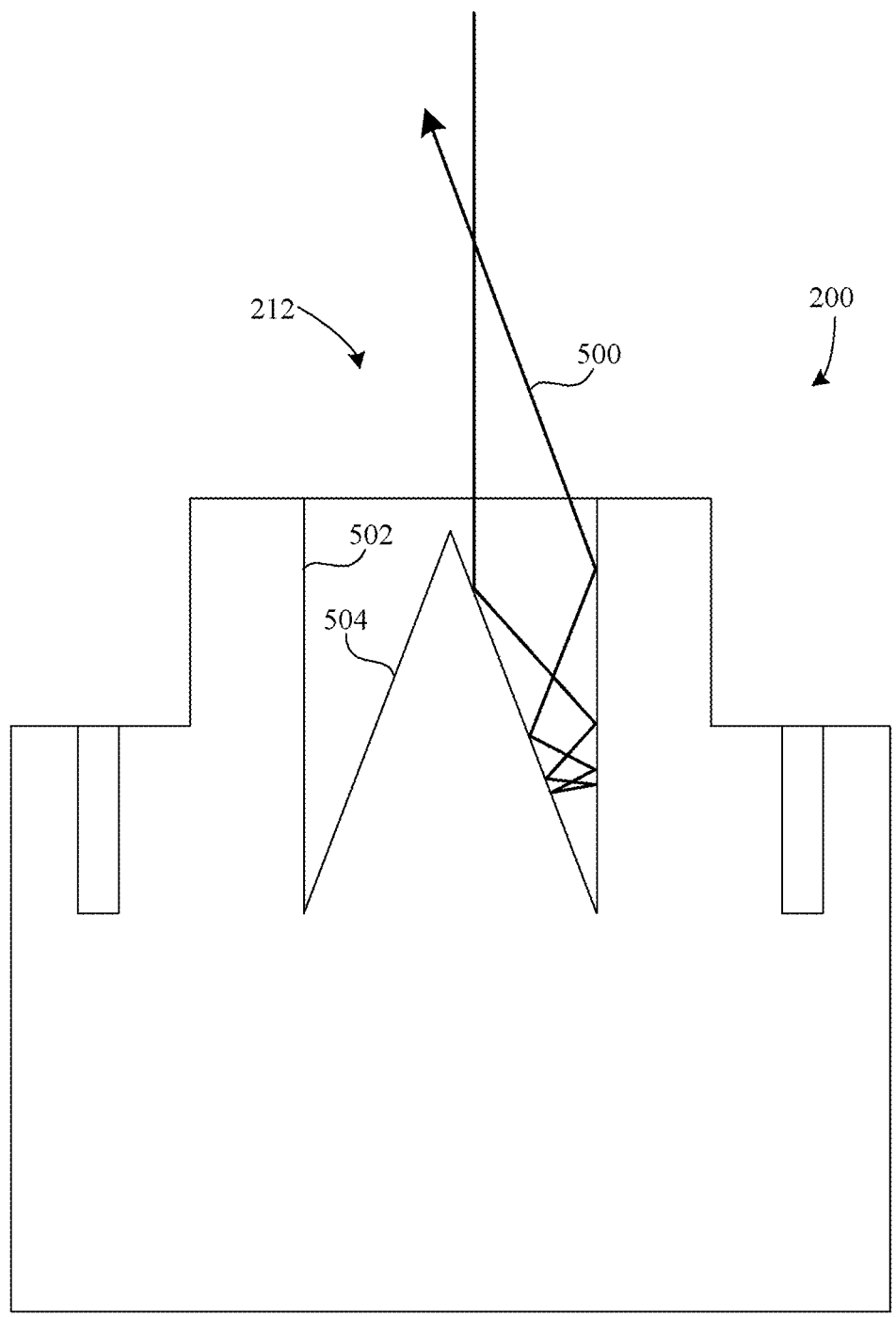
FIG. 5 is a cross sectional side view of a thermal receiver of the thermal energy storage device of FIG. 1 showing a sample incident ray trace.

FIG. 5 is a cross-sectional view of receiver 200 showing an example incident light ray 500 being reflected between a cylindrical wall 502 and an inclined wall 504 of absorbing portion 212. Unexpectedly, the inventors have determined that materials that have a relatively high reflectance (e.g., polished copper) can be effectively used in a thermal receiver of a solar collector. As an example of such material, the absorptivity of polished copper is 0.18. For maximum receiver efficiency, it is desirable to have low emissivity (to minimize radiative losses) and high absorptivity. However, materials with low emissivity, such as polished copper, are highly reflective and therefore necessarily have low absorptivity. The overall effective absorptivity of the receiver can be decoupled from the material's intrinsic absorptivity through the introduction of a structure within the receiver that forces many reflections of the incident light. Since the energy remaining in a light ray after one reflection is the product of incident energy and the reflectivity, a large number of reflections will guarantee that little reflected energy can escape the receiver. The receiver's radiative losses are also reduced by its high conductivity and intimate thermal contact with the MPCM, which assures that the absorbed energy is rapidly conducted away from the receiver. Particularly good results can be obtained using materials with an absorptivity of 0.2 or less, but with an emissivity coefficient of less than 0.1.

The description of particular embodiments of the present invention is now complete. Many of the described features may be substituted, altered or omitted without departing from the scope of the invention. For example, alternate thermal energy consuming devices (e.g., heaters, cookers, etc.), may be substituted for the Stirling engine used by way of example. This and other deviations from the particular embodiments shown will be apparent to those skilled in the art, particularly in view of the foregoing disclosure.

We claim:

1. A thermal energy storage device comprising:
   a container formed from a first material having a melting point at a first temperature;
   a quantity of metal disposed within said container and operative to store thermal energy, said metal having a melting point at a second temperature lower than said first temperature;
   a thermal energy receiver having an absorbing portion configured to absorb a portion of incident light and reflect another portion of said incident light to impinge on another area of said absorbing portion, said absorbing portion defining a cavity formed in said thermal energy receiver and including a cylindrical wall defining said cavity and defining an opening for receiving said incident light, said absorbing portion additionally including an inclined surface disposed within said cavity such that light reflecting off of said inclined surface impinges on said cylindrical wall, and light reflecting off of said cylindrical wall impinges on said inclined surface;
   means for conducting said thermal energy to said quantity of metal without the use of a conducting fluid; and
   a thermal energy discharge mechanism formed from a second material having a melting point at a third temperature, said thermal energy discharge mechanism extending through a wall of said container and into said quantity of metal and being operative to transfer thermal energy from said quantity of metal.

2. A thermal energy storage device comprising:
   a container formed from a first material having a melting point at a first temperature;
   a quantity of metal disposed within said container and operative to store thermal energy, said metal having a melting point at a second temperature lower than said first temperature;
   a thermal energy receiver formed from a second material having a melting point at a third temperature higher than said second temperature, said thermal energy receiver extending through a wall of said container and into said quantity of metal and being operative to transfer thermal energy to said quantity of metal; and
   a thermal energy discharge mechanism formed from a third material having a melting point at a fourth temperature, said thermal energy discharge mechanism extending through a wall of said container and into said quantity of metal and being operative to transfer thermal energy from said quantity of metal; and wherein
   said absorbing portion of said thermal energy receiver absorbs a portion of incident light and reflects another portion of said incident light to impinge on another area of said absorbing portion;
   said absorbing portion defines a cavity formed in said thermal energy receiver; and
   said absorbing portion includes
      a cylindrical wall defining said cavity and defining an opening for receiving said incident light, and
      an inclined surface disposed within said cavity such that light reflecting off of said inclined surface impinges on said cylindrical wall, and light reflecting off of said cylindrical wall impinges on said inclined surface.

3. A thermal energy storage device according to claim 2, wherein said second material is copper.

4. A thermal energy storage device according to claim 2, further comprising a reflector disposed to reflect solar energy onto an absorbing portion of said thermal energy receiver.

5. A thermal energy storage device according to claim 2, wherein said inclined surface is part of a structure having an apex disposed near said opening and having an apex angle of no greater than 45 degrees.

6. A thermal energy storage device according to claim 2, further comprising a Stirling engine having a hot cylinder in thermal contact with said thermal energy discharge mechanism.

7. A thermal energy storage device according to claim 6, wherein at least a portion of a hot cylinder of said Stirling engine forms a portion of said thermal energy discharge mechanism extending through said wall of said container.

8. A thermal energy storage device according to claim 2, wherein said thermal energy receiver and said thermal energy discharge mechanism are in direct contact with each other.

9. A thermal energy storage device according to claim 8, wherein said thermal energy receiver and said thermal energy discharge mechanism are formed integrally as a single piece extending through said quantity of metal.

10. A thermal energy storage device according to claim 2, wherein:
    said thermal energy receiver is adapted to receive thermal energy from a primary energy source; and
    wherein said thermal energy storage device includes an auxiliary energy source coupled to selectively supply energy to said quantity of metal when said thermal energy available from said primary energy source is determined to be insufficient.

11. A thermal energy storage device according to claim 10, wherein said auxiliary energy source is coupled to provide thermal energy directly to said quantity of metal.

12. A thermal energy storage device according to claim 10, wherein said auxiliary energy source is an electrical resistive heater.

13. A thermal energy storage device according to claim 2, wherein:
    said thermal energy receiver is adapted to receive solar energy; and
    said second material has an absorptivity value less than 0.2.

14. A thermal energy storage device according to claim 13, wherein said second material has an emissivity coefficient less than 0.1.

15. A thermal energy storage device according to claim 14, wherein said second material includes polished copper.

16. A thermal energy storage device according to claim 2, wherein said second material has an emissivity coefficient less than 0.1.

17. A thermal energy storage device according to claim 2, wherein said thermal energy receiver transfers said thermal energy to said quantity of metal without the use of a thermal conducting fluid.

18. A thermal energy storage device according to claim 2, wherein said metal of said quantity of metal has a thermal conductivity in its solid state of at least 150 W/m K (Watts per meter-Kelvin).

19. A thermal energy storage device according to claim 18, wherein said quantity of metal includes Aluminum.

\* \* \* \* \*

UNITED STATES PATENT AND TRADEMARK OFFICE
CERTIFICATE OF CORRECTION

PATENT NO. : 8,701,653 B2  Page 1 of 1
APPLICATION NO. : 13/166392
DATED : April 22, 2014
INVENTOR(S) : Spero et al.

It is certified that error appears in the above-identified patent and that said Letters Patent is hereby corrected as shown below:

In the specification, after the paragraph ending at Column 1, Line 10 and before the heading "BACKGROUND OF THE INVENTION" insert the following paragraph:

--GOVERNMENT LICENSE RIGHTS
This invention was made with government support under contract W911QY-11-0101 awarded by U.S. Army Soldiers Systems Center on February 26, 2011. The government may have certain rights in the invention.--

Signed and Sealed this
Third Day of May, 2016

Michelle K. Lee
*Director of the United States Patent and Trademark Office*